Figure 1:
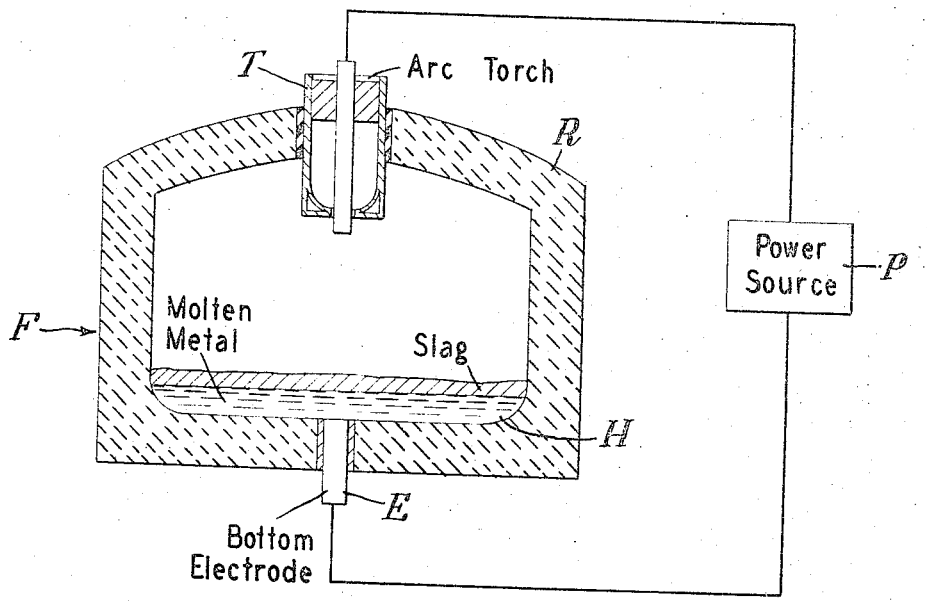

Oct. 17, 1967   F. S. DEATH ETAL   3,347,766
METHOD OF CONTACTING SLAG WITH A REDUCING ARC ATMOSPHERE
TO REDUCE THE METAL OXIDES CONTAINED THEREIN
Filed Oct. 1, 1963

INVENTORS
FRANK S. DEATH
BY  JOSEPH A. MORCIO

ATTORNEY

United States Patent Office 3,347,766
Patented Oct. 17, 1967

3,347,766
METHOD OF CONTACTING SLAG WITH A REDUCING ARC ATMOSPHERE TO REDUCE THE METAL OXIDES CONTAINED THEREIN
Frank S. Death, Tonawanda, and Joseph A. Morcio, Cheektowaga, N.Y., assignors to Union Carbide Corporation, a corporation of New York
Filed Oct. 1, 1963, Ser. No. 312,900
4 Claims. (Cl. 204—164)

This invention relates to an electric arc process for reducing metallic oxides more particularly it relates to such a process wherein a hydrocarbon gas is decomposed by an electric arc and becomes at least part of the arc plasma.

For purposes of this disclosure, the term "plasma" is used to signify a material in an energy state of particle activity above the gaseous state at least a portion of the atoms of the material being stripped of one or more electrons which are also present in the free state.

Additionally, for the purpose of this disclosure, the term "arc gas" means the gas which forms the majority of the arc plasma and may be for example argon, hydrogen, nitrogen, CO, xenon, neon, etc. The arc gas may also be a carbon-containing gas which in one embodiment is introduced into an already existent arc plasma and forms therewith at least a portion of the arc plasma. If the hydrocarbon gas is the arc gas, there is no need for introducing additional hydrocarbon gas into the arc plasma.

The main object of the invention is to provide a process for successfully utilizing a hydrocarbon gas to win metal values from liquid slags containing the oxides of such metals.

According to the present invention, there is provided a process for the gaseous reduction of liquid metal oxides wherein a slag layer containing the oxides to be reduced is provided over a molten metallic bath; an electric arc is established between a non-consumable electrode and the bath; an arc gas is passed through a nozzle having at least a central orifice the longitudinal axis of which is in alignment with the arc column and the walls of which are sufficiently proximate to the arc to impart directional stability to the arc column; a hydrocarbon gas is introduced into the arc column to thereby become at least part of the arc plasma; the hydrocarbon reaction products are transported in a highly reactive state in the arc plasma and then are impinged onto the surface of the slag layer whereby reduction products are formed and the reduced metals values are collected in the bath after sinking through the slag layer. The gaseous reduction products are exhausted from the furnace.

Figure 2:
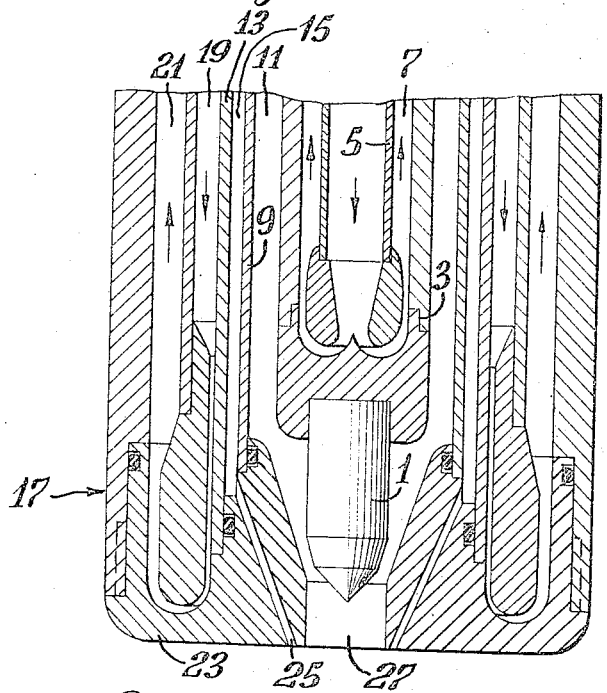

In the drawings:

FIGURE 1 is a schematic diagram of a typical system wherein the invention may be practiced; and FIGURE 2 is a partial cross-section of a typical device for providing a directionally stable arc plasma.

The invention is based on the discovery that metal values can be won from a liquid slag containing oxides of such metals by contacting such slag with an arc plasma containing, in a highly reactive state, dissociated products of a hydrocarbon gas.

For purposes of this disclosure, the term "directionally stable arc" is defined as an arc column the longitudinal axis of which will maintain the direction originally imparted to it.

There are several methods of producing and maintaining directionally stable arcs. Examples of directionally stable arcs of the type contemplated by our invention are described in Gage, U.S. Patent 2,806,124 and in U.S. Patent application Ser. No. 223,484 filed Sept. 13, 1962, to Robert J. Baird.

Referring to FIGURE 1, typical apparatus for carrying out the inventive process includes a directionally stable electric arc device T positioned in the roof R of a furnace. A bottom electrode E is positioned in the bottom of the furnace F. Power for the electric arc is provided by source P. Furnace design forms no part of the present invention and may be any conventional electric furnace construction.

In greater detail, a typical device for producing a directionally stable arc is shown in FIGURE 2. In this figure, an electrode 1 is carried by a hollow electrode holder 3 having positioned therein a baffle 5. Cooling water enters the baffle and leaves the holder in through the passage 7 formed by the baffle and walls of the hollow holder. A first tubular member 9 surrounds the electrode holder and forms therewith an arc gas passage 11. A second tubular member 13 surrounds the first tubular member 9 and forms a hydrocarbon gas passage 15 therebetween. This entire configuration is surrounded by a water jacket 17 having passages 19 and 21 for water in and water out. Depending from the plurality of tubular members and sealing the forward end of the water jacket 17 is a nozzle 23 having passages 25 arranged symmetrically around a center orifice 27 which passages are in registry in the hydrocarbon passages 15. The longitudinal axis of the central orifice 27 is in axial alignment with the electrode 1.

In describing actual operating procedures, reference will be made to the reduction of iron ore. However, the invention is not restricted thereto as will become obvious from the other examples.

In actual operation, a directionally stable transferred straight polarity electric arc is established between the device T and a small quantity of ingot iron positioned in the hearth H of furnace F. Current flows through the molten iron to the bottom electrode E to power source P. The iron ore to he reduced is added in sufficient quantity that when molten, it will form an electrically conductive liquid slag layer completely covering the molten metal surface (see FIGURE 1). Power input to the ore to be reduced may be controlled by merely changing the arc length of the directionally stable arc column. An arc gas, such as argon, is passed through passages 11 and together with the arc passes out of the torch through the orifice 27 of nozzle 23 as an arc plasma.

It is possible and in fact it is preferred to use a hydrocarbon gas, preferably methane, as the arc gas and thus eliminate the need for a seperate arc gas. In such case, the hydrocarbon gas would be introduced into the arc column before such column passes through the nozzle 23. The important criteria in either case is that the hydrocarbon be introduced into the arc and that the dissociation hydrocarbon products be carried in a highly reactive state to the molten metal surface by such arc.

The arc plasma carrying the reactive products of hydrocarbon dissociation is directed to and impinges on the slag layer covering the molten bath. Reaction of carbon with the molten oxide surface occurs bringing about reduction of the oxide to the melt. In addition, the hydrogen gas contacting the molten oxide also brings about in some instances additional reduction. The exit gas from the furnace will consist of the arc gas, e.g. argon, plus carbon oxide, hydrogen and water vapor with little or no hydrocarbon and no carbon fume present.

It is essential to proper operation of the process that carbon and hydrogen undergo reaction with the oxides in the vicinity of the arc impingement region at the surface of the molten oxide slag layer, so that carbon does not come directly into contact with the molten metal and, therefore, will not dissolve in it. Thus, a very low carbon melt is readily produced. If an adequate slag layer is not maintained over the melt throughout the process, considerable carbon pick-up may occur. The molten metal sinks down through the slag as it is formed and unites with the molten metal below the slag.

The process of the invention is applicable to almost any reducible metal oxide, including iron oxide, manganese oxide, chromium oxide and mixtures thereof. Also, the process is applicable to the production of very low carbon alloys such as stainless steel or ferrochromes wherein the starting materials include at least one of the above oxides. Further, the process could be operated either batchwise, or continuously with ore being continually added and molten metal continually withdrawn.

The following are examples of the invention and are presented merely for illustratve purposes and to aid those skilled in the art to gain a better understanding of the variables involved in the inventive process.

In one experiment carried out in a 50 lb. furnace similar to that illustrated in FIGURE 1, a 20 pound charge of ingot iron was melted down using a directionally stable electric arc with argon as the torch gas. The arc current was 450 amps. at 40 volts. Iron ore was added in sufficient quantity to completely cover the bath when the slag became molten. Methane was then admitted to the arc plasma effluent through symmetrically arranged passages in the torch nozzle. Iron ore was added in one pound lots whenever a small spot of bare metal appeared in the arc plasma impingement area. The arc torch was operated with about 100 c.f.h. of argon and 10–15 c.f.h. of methane. The iron ore employed was a Brazilian Hematite ore with an iron content of about 67%. A total of 13 pounds of ore was added and the net amount of iron recovered was 9 pounds. This indicates that, within the limits of experimental measure, 100% of the iron units in an ore can be recovered by the process of the invention.

A further very important point is that the process of this invention does not result in the formation of a carbon-saturated iron. Essentially all the carbon is used to reduce the oxide, as shown by the very low carbon content in the melt at the end of the reduction. Pin tube samples showed an average carbon content of about 100 p.p.m. (all samples had a carbon content below 200 p.p.m. and one sample contained only 60 p.p.m.).

An experiment directed toward the reduction of chromium oxide was carried out in the furnace described above. The oxide was added to the surface of a 20 lb. charge of molten ingot iron until a slag layer covered the metal and then methane was introduced into the arc plasma. Lime, fluorspar and silica were added in small amounts to the slag in an attempt to make it fluid. The variation in chromium and carbon content of the melt as the run proceeded is shown in Table I below.

TABLE I.—CHROMIUM OXIDE REDUCTION

| Time (p.m.) | Sample No. | Percent C | Percent Cr |
|---|---|---|---|
| 12:10 | CH₄ On | | |
| 12:21 | 1 | .005 | 3.92 |
| 12:34 | 2 | .005 | 4.64 |
| 12:53 | 3 | .005 | 5.90 |
| 1:23 | 4 | .005 | 7.13 |
| 2:07 | 5 | .006 | 8.63 |
| 2:08 | CH₄ Off | | |

The test results show that the chromium content of the melt increased to 8.63% during the period of methane addition, proving that chromium oxide can be readily reduced by the subject process. Furthermore, the carbon content of the bath remained at the very low level of 50 to 60 p.p.m. There was no $CO_2$ present in the exhaust gas.

While the inventive concept has been described with reference to certain preferred embodiments, it is to be understood that variations in the process may be made by those skilled in the art without departing from the spirit and scope of the invention.

What is claimed is:

1. A method for reduction of metal oxides which comprises providing and maintaining a molten metallic bath, providing a molten electrically conductive slag layer substantially completely covering said bath, said slag layer containing at least one metal oxide selected from the group consisting of iron oxide, manganese oxide, chromium oxide and mixtures thereof establishing an electric arc between the non-consumable electrode and said bath, passing an arc gas taken from the class consisting of hydrocarbon gases, argon, helium, nitrogen, hydrogen, carbon monoxide and mixtures thereof through a nozzle having at least a central orifice the longitudinal axis of which is in alignment with said arc, and introducing a hydrocarbon gas into the arc column to thereby become at least part of the arc plasma, with the proviso that if the arc gas be a hydrocarbon gas the introduction of a hydrocarbon gas into the arc column may be eliminated, transporting the hydrocarbon reaction products in a highly reactive state in the arc plasma, impinging the arc plasma onto the surface of said slag layer where reduction products are formed while maintaining said substantial complete slag layer covering said bath, and then collecting the reduced metal values in the molten metallic bath.

2. A method according to claim 1 wherein the arc gas is argon and the hydrocarbon gas is methane.

3. A method for reduction of iron oxide which comprises providing and maintaining a molten metallic bath, providing a molten electrically conductive slag layer substantially completely covering said bath, said slag layer containing the iron oxides which are to be reduced, establishing an electric arc between the non-consumable electrode and said bath, passing an arc gas taken from the class consisting of hydrocarbon gases, argon, helium, nitrogen, hydrogen, carbon monoxide and mixtures thereof through a nozzle having at least a central orifice the longitudinal axis of which is in alignment with said arc, and introducing a hydrocarbon gas into the arc column to thereby become at least part of the arc plasma, with the proviso that if the arc gas be a hydrocarbon gas the introduction of a hydrocarbon gas into the arc column may be eliminated, transporting the hydrocarbon reaction products in a highly reactive state in the arc plasma, impinging the arc plasma onto the surface of said slag layer where reduction products are formed while maintaining said substantial complete slag layer covering said bath, and then collecting the reduced iron metal values in the molten metallic bath.

4. A method according to claim 3 wherein the arc gas is argon and the hydrocarbon gas is methane.

References Cited

UNITED STATES PATENTS

| 3,009,783 | 11/1961 | Sheer et al. | 204—173 |
| 3,232,746 | 2/1966 | Karlovitz | 204—164 |
| 3,257,197 | 6/1966 | Death et al. | 204—164 |

JOHN H. MACK, *Primary Examiner.*

ROBERT K. MIHALEK, *Examiner.*